(12) United States Patent
Roty et al.

(10) Patent No.: US 9,333,718 B2
(45) Date of Patent: May 10, 2016

(54) VULCANIZING MOULD FOR MOULDING AND VULCANIZING A TIRE

(75) Inventors: Gaël Roty, Chiyoda-ku (JP); Kazutaka Yokokawa, Chiyoda-ku (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 394 days.

(21) Appl. No.: 13/976,227

(22) PCT Filed: Dec. 21, 2011

(86) PCT No.: PCT/EP2011/073623
§ 371 (c)(1),
(2), (4) Date: Jul. 24, 2013

(87) PCT Pub. No.: WO2012/089589
PCT Pub. Date: Jul. 5, 2012

(65) Prior Publication Data
US 2013/0292016 A1 Nov. 7, 2013

(30) Foreign Application Priority Data
Dec. 30, 2010 (FR) .................................... 10 61358

(51) Int. Cl.
*B29D 30/06* (2006.01)
*B60C 11/03* (2006.01)

(52) U.S. Cl.
CPC ........ *B29D 30/0606* (2013.01); *B29D 30/0629* (2013.01); *B60C 11/03* (2013.01); *B60C 11/0306* (2013.04); *B60C 11/0318* (2013.04); *B29D 2030/0612* (2013.01)

(58) Field of Classification Search
CPC .......... B29D 30/0606; B29D 30/0629; B29D 2030/0612; B60C 11/03; B60C 11/0306; B60C 11/0318
See application file for complete search history.

(56) References Cited

U.S. PATENT DOCUMENTS 5,234,326 A * 8/1993 Galli ....................... B29C 33/10
425/46
5,769,990 A 6/1998 Hoffmeister
(Continued)

FOREIGN PATENT DOCUMENTS

EP 0 579 436 A1 1/1994
EP 0 876 889 A2 11/1998
(Continued)

OTHER PUBLICATIONS

International Search Report (PCT/ISA/210) issued on Apr. 17, 2012, by the European Patent Office as the International Searching Authority for International Application No. PCT/EP2011/073623.

*Primary Examiner* — James Mackey
(74) *Attorney, Agent, or Firm* — Dickinson Wright PLLC

(57) ABSTRACT

A vulcanizing mold for molding and vulcanizing a tire, comprising a molding surface extending circumferentially in the mold, and comprising two end strips of patterns arranged respectively close to two edges of the molding surface and at least one intermediate strip of patterns positioned between the two end strips of patterns. At least one end strip comprises patterns belonging to a first pattern type and the patterns of the first pattern type have a width which is less than the width of the patterns belonging to the other pattern types of the end strip, and the patterns of the first pattern type are grouped at least in twos on first segments of the mold. The patterns of the end strip not belonging to the first pattern type belong to second segments, each second segment comprising just one pattern of the said end strip.

4 Claims, 2 Drawing Sheets

(56) References Cited

U.S. PATENT DOCUMENTS 6,220,844 B1 * 4/2001 Kusano .............. B29D 30/0606
  152/209.2
8,731,871 B2 * 5/2014 Stuckey .............. G06F 17/5095
  703/1

FOREIGN PATENT DOCUMENTS

| EP | 1 232 843 A2 | 8/2002 |
| JP | 4-201610 A | 7/1992 |
| JP | 8-034212 A | 2/1996 |
| WO | WO 00/76790 A1 | 12/2000 |

* cited by examiner

VULCANIZING MOULD FOR MOULDING AND VULCANIZING A TIRE

BACKGROUND

1. Field of the Invention

The present invention relates to a vulcanizing mould for moulding and vulcanizing a tire, and more specifically to a mould for moulding and vulcanizing a tire that has a tread pattern that allows the running noise of this tire to be reduced very appreciably.

2. Related Art

Document EP0876889 discloses a mould intended for moulding and vulcanizing tires. This mould comprises, radially internally, a moulding surface intended to mould the tread surface of the tires. The moulding surface is formed by assembling a plurality of mould segments.

FIG. 1 shows part of the moulding surface of this mould. This part of the moulding surface is formed by assembling two mould segments A, B.

The part of the moulding surface comprises a plurality of patterns organized in circumferential strips b1, b2, b3, b4, b5. Each circumferential strip comprises patterns derived from one and the same basic pattern. What is meant by a basic pattern is a design formed of a collection of protrusions and hollows arranged in a predetermined manner, this design being repeated n times in the circumferential strip.

In document EP0876889, each mould segment comprises several patterns belonging to the various circumferential strips and each mould segment comprises a single pattern of each circumferential strip. Thus, if each circumferential strip comprises n patterns, the mould then comprises n mould segments.

In order further to improve the acoustic performance of tires, it has been proposed for the number of patterns in the circumferential strips to be increased substantially and for the width of the patterns in the circumferential direction therefore to be decreased accordingly. Because the segments are narrower, they are then more fragile and the risks of these segments becoming damaged when they are being handled, for example when they are being fitted into the mould, increase.

There is therefore a need to improve the rolling noise reduction of tires while at the same time ensuring that the segments belonging to the mould used to mould the said tires are very robust.

SUMMARY OF THE INVENTION

The invention relates to a vulcanizing mould for moulding and vulcanizing a tire. The mould comprises a moulding surface extending circumferentially in the mould, the said moulding surface comprising two end strips of patterns arranged respectively close to two edges of the moulding surface and at least one intermediate strip of patterns positioned between the two end strips of patterns, and for at least one of the end strips, all the patterns of the said strip are derived from one and the same basic pattern. The end strip comprises at least three types of pattern and the patterns belonging to one and the same pattern type have the same width which differs from the width of the patterns belonging to the other pattern types of the strip. The patterns are arranged in the end strip as a function of their width in a predefined sequence, the sum of the widths of the patterns belonging to the end strip corresponding to the circumference of the moulding surface, the patterns of the end strip being distributed over mould segments intended to be assembled to form the moulding surface. The end strip comprises patterns belonging to a first pattern type and the patterns of the first pattern type have a width which is less than the width of the patterns belonging to the other pattern types of the end strip, and the patterns of the first pattern type are grouped at least in twos on first segments of the mould. The patterns of the end strip not belonging to the first pattern type belong to second segments, each second segment comprising just one pattern of the said end strip.

Thus, the invention proposes grouping together at least in twos those patterns that have the narrowest width. This then ensures that the first segments bearing these patterns are wide enough to withstand the mechanical forces associated with handling them. The invention also proposes grouping together only the patterns of the first pattern type and not the patterns of a second pattern type or of a third pattern type which have greater widths. This then limits the number of segments having more than two patterns belonging to one and the same circumferential strip.

The invention also proposes not grouping together on one and the same first segment patterns that have different widths. This improves the running noise reduction of a tire moulded using the mould that forms the subject of the invention.

In an alternative form of embodiment, the first mould segments and the second mould segments each comprise a pattern belonging to an intermediate strip of patterns. The patterns of the intermediate strip belonging to the first mould segments each comprise a protrusion of parallelepipedal overall shape the longest dimension of which extends in a first direction making an angle greater than or equal to 40° with a transverse direction and the patterns of the intermediate strip belonging to the second mould segments each comprise a protrusion having a parallelepipedal overall shape the longest dimension of which extends in a second direction making an angle less than 40° with the said transverse direction.

The noise generated by a tire moulded using the mould that is the subject of the invention, when this tire is running, is reduced still further.

BRIEF DESCRIPTION OF THE DRAWINGS

Other features and advantages of the invention will become apparent from the following description, given by way of entirely nonlimiting example, with reference to the attached drawings in which.

In the description that follows, elements that are substantially identical or similar will be denoted by identical references.

Figure 1:
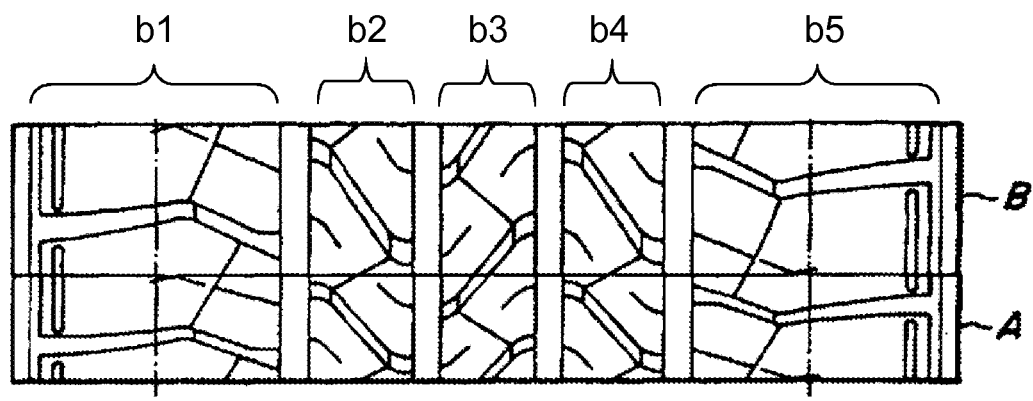
FIG. 1 schematically depicts a partial view of the moulding surface of a mould according to the prior art.
Figure 2:
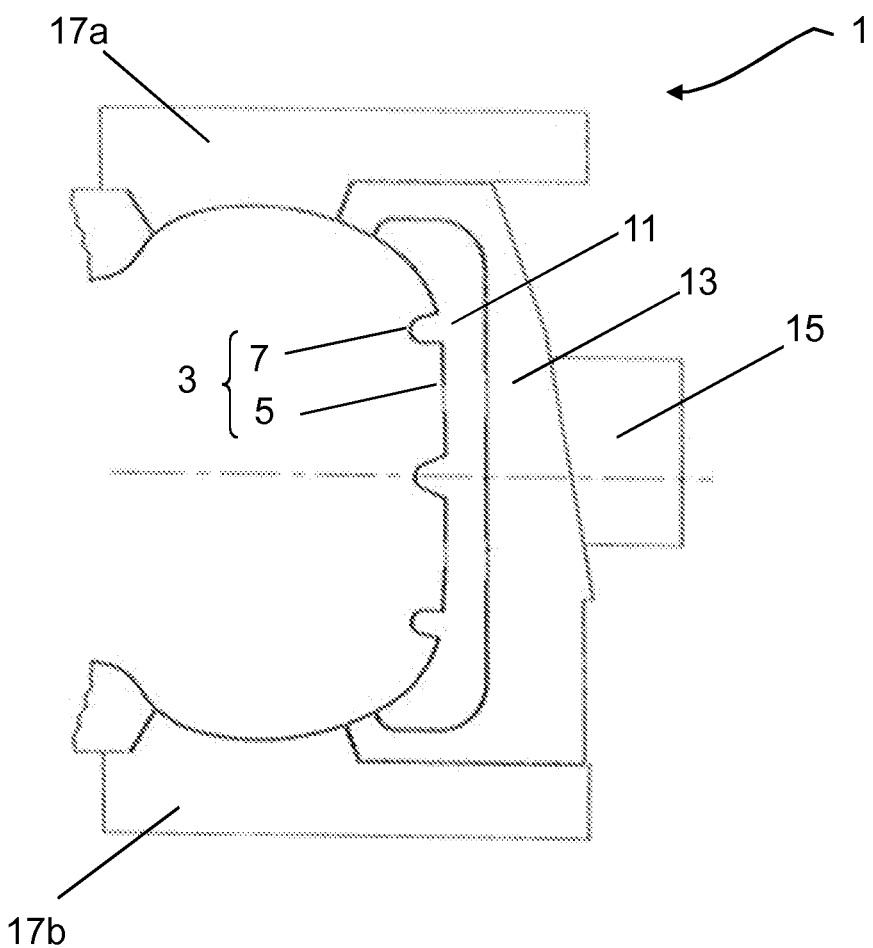
FIG. 2 schematically depicts a view in cross section of a mould that forms the subject matter of the invention.

FIG. 2 depicts a view in cross section of one example of a mould 1 according to the invention, for vulcanizing a tire.

DETAILED DESCRIPTION OF SPECIFIC EMBODIMENTS

The mould 1 comprises a moulding surface 3 arranged on the inside of the mould. This moulding surface 3 comprises a bottom 5 and parts projecting from the bottom to form protrusions 7. The bottom 5 of the moulding surface is intended to mould a tread surface of a tire and the protrusions 7 are intended to mould grooves or sipes in the tread of this tire.

The moulding surface 3 is formed by the edge-to-edge assembly of several segments 11, just one of which has been depicted here. The segment 11 is fixed to a sector 13 and the sector 13 is connected to an actuator 15.

The mould also comprises an upper shell 17a and a lower shell 17b. This upper shell 17a is intended to be connected to an upper platen of a vulcanizing press. The lower shell 17b is intended to be connected to a lower platen of the vulcanizing press. The upper shell 17a and the lower shell 17b are intended to mould the sidewalls of the tire.

The mould 1 here is in a closed position in which the segments 11, the upper shell 17a, the lower shell 17b define a toroidal cavity.

When the mould 1 is in the open position, the upper shell 17a, the lower shell 17b, the segments 11 are moved apart to allow the tire to be loaded into the mould 1 or to allow the said tire to be unloaded from the mould 1.

Figure 3:
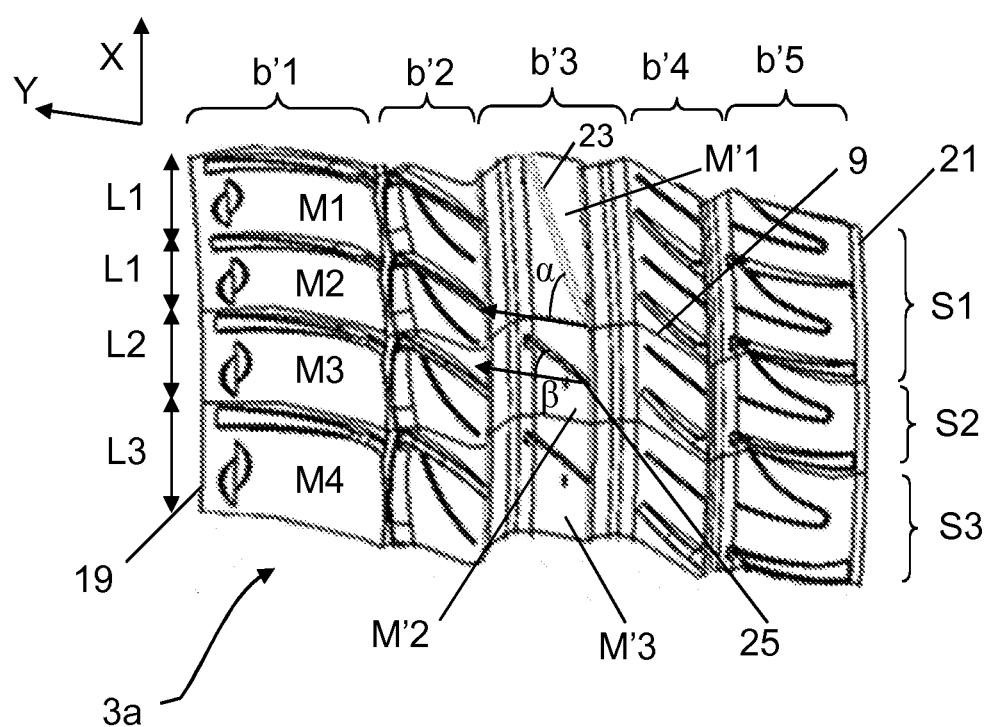
FIG. 3 schematically depicts a partial view of the moulding surface of the mould of FIG. 2.

FIG. 3 schematically depicts a partial view of the moulding surface of the mould of FIG. 2.

The part 3a of the moulding surface extends in a circumferential direction X. This part 3a is bounded by two edges 19, 21.

The part 3a of the moulding surface comprises a plurality of circumferential strips b'1, b'2, b'3, b'4, b'5. Thus two circumferential end strips b'1, b'5 positioned respectively close to the two edges 19, 21 and intermediate circumferential strips b'2, b'3, b'4 positioned between the two circumferential end strips b'1, b'5 can be discerned.

Each circumferential strip comprises a plurality of patterns. More specifically, each end strip b'1, b'5 positioned respectively close to the edges 19, 21 comprises patterns M1, M2, M3, M4. To make the invention easier to understand, only the patterns belonging to the end strip b'1 positioned near the edge 19 have been referenced in FIG. 3.

The patterns M1, M2, M3, M4 of the strip b'1 are derived from one and the same basic pattern. What is meant by "derived from one and the same basic pattern" is that the patterns M1, M2, M3, M4 of the strip b'1 have the same overall design. This design comprises a set of protrusions and hollows arranged in a predetermined manner.

The patterns M1, M2, M3, M4 of the strip b'1 are classified into different pattern types according to their width. The width of a pattern here is the dimension measured in the circumferential direction X. In the embodiment of FIG. 3, the strip b'1 comprises three pattern types. The patterns M1, M2 of the strip b'1 have the narrowest width L1. These patterns belong to a first pattern type. The pattern M4 has the greatest width L3. This pattern M4 belongs to a third pattern type. The pattern M3 has a width L2 greater than the width L1 of the patterns of the first pattern type and less than the width L3 of the patterns of the third pattern type. This pattern M3 belongs to a second pattern type. By way of example, the ratio between the width L1 of a pattern of the first pattern type and the width L3 of a pattern of the third pattern type is greater than or equal to 0.6 and less than 0.8. Similarly, the ratio between the width L2 of a pattern of the second pattern type and the width L3 of a pattern of the third pattern type is greater than or equal to 0.8 and less than or equal to 0.90.

The patterns M1, M2, M3, M4 of the end strip b'1 are distributed over mould segments S1, S2, S3. These mould segments are delimited by parting lines 9.

In the example of FIG. 3, the patterns M1, M2 are grouped on a first mould segment S1. The width of the segment S1 therefore corresponds to twice the width L1 of the patterns of the first pattern type. This then ensures that the first segment S1 is robust enough to be able to withstand the mechanical loadings applied as it is mounted in or removed from the mould.

The pattern M3 belongs to a second segment S2. The pattern M4 belongs to a third segment S3.

The segments S1, S2, S3 comprise other patterns belonging to other circumferential strips b'2, b'3, b'4, b'5. More particularly, the segments S1, S2, S3 comprise patterns M'1, M'2, M'3 belonging to the intermediate circumferential strip b'3. This circumferential strip b'3 here is positioned at the centre of the moulding surface.

Thus, the first mould segment S1 comprises a pattern M'1 of the strip b'3 having a protrusion 23. This protrusion 23 is of parallelepipedal overall shape. The protrusion extends mainly in a direction making an angle $\alpha$ with the transverse direction Y. The angle $\alpha$ here is greater than or equal to 40°. In the example of FIG. 3, the protrusion runs parallel to a diagonal of the pattern M'1 and the length of the protrusion corresponds to at least 90% of the length of this diagonal.

The second mould segment S2 and the third mould segment S3 comprise patterns M'2, M'3 derived from one and the same basic pattern. Each pattern M'2, M'3 comprises a protrusion 25. This protrusion 25 extends in a predetermined direction making an angle $\beta$ with the transverse direction Y. The angle $\beta$ here is less than 40°.

The invention also relates to a tire moulded using the mould 1. The tread surface of the tire tread is then the negative of the moulding surface of the mould. This tread comprises a plurality of circumferential strips of blocks corresponding to the circumferential strips of patterns on the moulding surface of the mould.

It will be noted that the mould segment parting lines 9 are visible on the tire, these parting lines moulding flash on the tire tread. It is thus possible easily to identify the features of the mould that forms the subject matter of the invention on the tire moulded using the said mould.

The invention claimed is:

1. A vulcanizing mould for moulding and vulcanizing a tire, comprising a moulding surface extending circumferentially and assembled from mould segments, the moulding surface comprising:

two opposed edges, each of which extend circumferentially;

two end strips, each arranged adjacent to a respective edge and each comprising a sequence of end strip patterns arranged circumferentially, each end strip pattern conforming to an end strip pattern type, comprising:

an end strip pattern design comprising collection of protrusions and hollows arranged in a predetermined manner, and an end strip pattern width, measured in the circumferential direction, and wherein:

each end strip comprises end strip patterns belonging to at least three different end strip pattern types, a first pattern type, a second pattern type, and a third pattern type, each having the same end strip pattern design but different end strip pattern widths;

in at least one end strip the end strip pattern types are of the same pattern design;

the end strip widths of the sequence of end strip patterns sum to the circumference of the moulding surface;

each end strip comprises end strip patterns arranged in a predefined sequence as a function of the end strip width of their end strip pattern type, such that:

a first mould segment (S1) comprises groups of at least two end strip patterns (M1, M2) of the first end strip pattern type having an end strip pattern width less than that of the second and third end strip pattern type, and second mould segments (S2, S3) comprise a single end strip pattern (M3, M4) not belonging to the first end strip pattern type; and at least one intermediate strip positioned between the two end strips, comprising a sequence of intermediate strip patterns arranged circumferentially, each intermediate strip pattern conforming to an intermediate strip pattern type comprising:

an intermediate strip pattern design comprising collection of protrusions and hollows arranged in a predetermined manner, and an intermediate strip pattern width, measured in the circumferential direction.

2. The vulcanizing mould according to claim 1, wherein the first mould segment further comprises an intermediate strip pattern comprising a protrusion having an overall shape of a parallelepiped having a longest dimension extending in a first direction (X) and forming an angle $\alpha$ greater than or equal to 40° with a dimension extending in a transverse direction (Y); and the second mould segment further comprises an intermediate strip pattern comprising a protrusion having an overall shape of a parallelepiped having a longest dimension extending in a first direction (X) and forming an angle $\beta$ less than 40° with a dimension extending in a transverse direction (Y).

3. The vulcanizing mould according to claim 1, comprising at least two intermediate strips, each having different intermediate strip pattern designs.

4. The vulcanizing mould according to claim 3, comprising three intermediate strips, each having different intermediate strip pattern designs.

* * * * *